3,730,942
SELF-EXTINGUISHING COMPOSITION
Joseph Green, East Brunswick, and John Versnel, Plainsboro, N.J., assignors to Cities Service Company, New York, N.Y.
No Drawing. Filed Oct. 8, 1971, Ser. No. 187,896
Int. Cl. C08f 45/04
U.S. Cl. 260—41 A                9 Claims

ABSTRACT OF THE DISCLOSURE

A non-drip, self-extinguishing composition comprises polyethylene, a halogenated organic flame retardant, ammonium fluoborate or ammonium sulfate, a metal compound synergist such as antimony trioxide, and silica.

BACKGROUND OF THE INVENTION

Field of the invention

This invention relates to self-extinguishing polyethylene compositions and more particularly relates to non-drip, self-extinguishing polyethylene compositions containing a halogenated organic flame retardant.

Description of the prior art

It is known that polyethylene may be rendered self-extinguishing by the incorporation of a halogenated organic flame retardant. It is also known that most self-extinguishing polyethylene compositions have the disadvantage of dripping when exposed to a flame. Although dripping may sometimes be prevented by using high concentrations of flame retardant, this solution to the problem is economically unattractive. It would obviously be desirable to find a more attractive method of rendering self-extinguishing polyethylene compositions non-dripping.

SUMMARY OF THE INVENTION

An object of this invention is to provide non-drip, self-extinguishing polyethylene compositions.

Another object is to provide such compositions containing about 2–10% by weight of a halogenated organic flame retardant.

These and other objects are attained by blending polyethylene with about 2–10% by weight of a halogenated organic flame retardant, about 5–10% by weight of ammonium fluoborate or ammonium sulfate, about 5–10% by weight of a metal compound synergist, and about 15–25% by weight of silica, all percentages being based on the total weight of the composition.

DESCRIPTION OF THE PREFERRED EMBODIMENTS

The polyethylene employed in the practice of the invention may be high or low density polyethylene, and it is combined with the other ingredients so as to constitute about 55–70%, preferably about 60%, by weight of the composition.

The halogenated flame retardant may be any of the halogenated organic flame retardants conventionally used in polyethylene compositions. Thus, it may be a halogenated aromatic flame retardant or a halogenated aliphatic flame retardant, i.e., a compound having halo substituents on aliphatic or cycloaliphatic carbon atoms. The halo substituents may be chloro and/or bromo.

As is well known, the halogenated aromatic flame retardants ordinarily correspond to the formula $$Y(X)_m(Z)_n$$

wherein Y is an aromatic hydrocarbon residue, especially a residue derived from benzene, biphenyl, naphthalene, or anthracene; X is chloro or bromo; Z is alkyl, haloalkyl, alkenyl, haloalkenyl, aryl, haloaryl, aralkyl, haloaralkyl, hydroxy, alkyloxy, haloalkoxy, alkenyloxy, haloalkenyloxy, aryloxy, haloaryloxy, arylsulfonl, or haloarylsulfonyl; $m$ is an integer of at least 2; and $n$ is 0 or 1. Exemplary of these flame retardants are tribromoaniline, dibromosalicylanilide, tribromosalicylanilide, tetrabromobenzene, hexabromobenzene, hexachlorobenzene, tribromotoluene, chlorotribromotoluene, dibromobiphenyl, hexabromobiphenyl, octabromobiphenyl, decabromobiphenyl, decachlorobiphenyl, dibromonaphthalene, 2,4-dibromo - 1 - methylnaphthalene, 1,5-dibromoanthracene, tetrabromobisphenol A, tribromophenol, pentabromophenol, tribromochlorophenol, tetrabromochlorophenol, pentabromophenyl ethyl ether, pentabromophenyl propyl ether, pentabromophenyl dibromopropyl ether, tribromophenyl allyl ether, chlorodibromophenyl allyl ether, pentabromophenyl allyl ether, 2,3,3-tribromoallyl 2,4,6-tribromophenyl ether, hexabromodiphenyl ether, 2,2-bis[3,5-dibromo - 4 - (2,3,3-tribromoallyloxy)phenyl] propane, tetrabromodiphenyl sulfone, etc. Particularly preferred aromatic flame retardants are decabromobiphenyl, hexabromobiphenyl, and hexabromodiphenyl ether.

Exemplary of utilizable aliphatic flame retardants are tetrabromoethane, pentachloroethane, hexabromoethane, hexachloroethane; tetrachlorodibromoethane; phenylhexabromodecane, 2,3,3-tribromoallyl 2,4,6-tribromophenyl ether, N,N',N''-tris(2,3 - dibromopropionyl)-trimethylene triamine, methylene-bis(1,2-dibromo - 1 - methylpropionamide), 2,3-dibromobuten-2-diol-1,4, bis(2,3,3-tribromoallyl) maleate; bis(2-bromoethyl)-2-chloroethyl phosphate; esters of 2,3-dihalopropanol-1, such as tris(2,3-dibromopropyl) isocyanurate, tris(2,3 - dibromopropyl) phosphate, tris(2,3-dichloropropyl) phosphate, etc.; halogenated oligomers of butadiene or isoprene having a degree of polymerization of 2–2000, such as the tetrabromocyclooctane, dibromoethyldibromocyclohexanes, hexabromocyclododecanes, etc.; the halogenated cyclopentadiene adducts described in U.S. Pat. 3,418,263, such as the 2:1 adduct of hexachlorocyclopentadiene and cyclooctadiene-1,5, etc.; the polybrominated 1:1 Diels-Alder adducts described below, such as 5,6-dibromo-1,10,11,12, 13,13-hexachlorotricyclo[8,2,1,0$^{2,9}$]tridecene-11 (i.e., the dibrominated 1:1 Diels-Alder adduct of hexachlorocyclopentadiene and cyclooctadiene-1,5), etc.; the cyclic imides described below, such as N-2,3-dibromopropyl-5,6-dibromonorbornane-2,3-dicarboximide, etc.

The aforementioned polybrominated 1:1 Diels-Alder adducts are adducts of a polyhalocyclopentadiene and a polyunsaturated aliphatic or cycloaliphatic hydrocarbon containing at least four, usually 4–20, carbon atoms. They correspond to the formula:

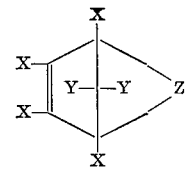

wherein X is chloro or bromo, Y is halo, hydrogen, alkyl, or alkoxy, and Z is a divalent polybromo aliphatic or cycloaliphatic hydrocarbon radical containing at least four carbon atoms and at least two bromo substituents, the free valences being on adjacent carbon atoms. When Y is alkyl or alkoxy, it usually contains 1–16, preferably 1–5, carbon atoms. The preferred flame retardants are those in which X is chloro, Y is chloro, bromo, or fluoro, and Z is a polybromo cycloaliphatic hydrocarbon radical containing 5–16 carbon atoms and 2–6 bromo substituents. These adducts and methods for preparing them are more fully disclosed in copending aplication Ser. No. 115,081, filed Feb. 12, 1971, in the name of Jack Newcombe, the teachings of which are incorporated herein by reference.

The aforementioned cyclic imides are compounds containing the structure:

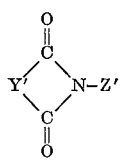

wherein Z' is a hydrocarbon, chlorinated hydrocarbon, or brominated hydrocarbon radical and Y' is a divalent radical corresponding to one of the formulas:

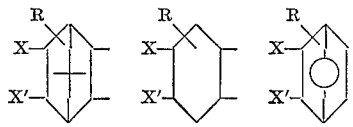

wherein X is chloro or bromo, X' is hydrogen, chloro, or bromo, and R is hydrogen or methyl. Z may be alkyl, alkenyl, aryl, aralkenyl, aralkyl, alkaryl, or cycloaliphatic or a halogenated derivative of such radicals but is preferably phenyl, tolyl, benzyl, or 2,3-dibromopropyl. The preferred imides for use in the present invention are those in which Y' corresponds to the formula:

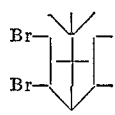

These imides and methods for preparing them are more fully disclosed in copending application Ser. No. 183,696, filed Sept. 24, 1971, in the names of Anderson O. Dotson, Jr., Jack Newcombe, and Lionel T. Wolford, the teachings of which are incorporated herein by reference.

As mentioned above, the flame retardant and the ammonium fluoborate or ammonium sulfate are employed in respective concentration of about 2–10% and about 5–10%, based on the total weight of the composition. When one of these components is employed in an amount approaching its minimum concentration, it is usually desirable to employ the other component in an amount approaching its maximum concentration. Each of these components is utilizable in an amount higher than 10% by weight, but the use of larger amounts of the components is economically less desirable. The flame retardant is preferably employed in a concentration of about 3–10%, more preferably about 5–10%.

The metal compound employed as a synergist in the compositions of the invention may be any of the metal compounds conventionally employed as synergists for halogenated flame retardants. Thus, it may be an organometallic compound but is usually an oxide or sulfide of a polyvalent metal such as antimony, arsenic, bismuth, tin or titanium. The preferred synergist is antimony trioxide.

Although the compositions of the invention may be prepared by any suitable technique, they are usually prepared by mixing the additives with molten polyethylene to provide an intimate admixture.

The compositions of the invention are particularly advantageous in that they have non-drip and self-extinguishing properties at a low concentration of flame retardant. When tested in accordance with Underwriters' Laboratories Test 94, they have ratings of SE–0 or SE–I.

The following examples are given to illustrate the invention and are not intended as a limitation thereof. Unless otherwise specified, parts mentioned are parts by weight.

EXAMPLE I—CONTROL

Blend 90 parts of low density polyethylene with (a) 5 parts of the dibrominated 1:1 Diels-Alder adduct of hexachlorocyclopentadiene and cyclooctadiene-1,5 and (b) 5 parts of antimony trioxide on a two-roll mill. The composition has an oxygen index of 25.5 and a UL–94 rating of SE–II.

EXAMPLE II

Blend 60 parts of low density polyethylene with (a) 5 parts of the dibrominated 1:1 Diels-Alder adduct of hexachlorocyclopentadiene and cyclooctadiene - 1,5, (b) 5 parts of antimony trioxide, (c) 20 parts of finely-divided silica, and (d) 10 parts of ammonium fluoborate on a two-roll mill. The composition has an oxygen index of 25.2 and a UL–94 rating of SE–I.

EXAMPLE III

Prepare five compositions by repeating Example II except for replacing the brominated Diels-Alder adduct with (1) N - 2,3-dibromopropyl-5,6-dibromonorbornane-2,3 - dicarboximide, (2) N-phenyl - 5,6 - dibromonorbornane - 2,3 - dicarboximide, (3) dibromoethyldibromocyclohexane, (4) hexabromocyclododecane, and (5) decabromobiphenyl, respectively. The compositions have respective oxygen indices of 26.6, 25.5, 26.2, 28.1, and 25.9 and respective UL–94 ratings of SE–O, SE–I, SE–I, SE–O, and SE–I.

EXAMPLE IV

Blend 60 parts of low density polyethylene with (a) 10 parts of the dibrominated 1:1 Diels-Alder adduct of hexachlorocyclopentadiene and cyclooctadiene-1,5, (b) 10 parts of antimony trioxide, (c) 15 parts of finely-divided silica, and (d) 5 parts of ammonium sulfate on a two-roll mill. The composition has an oxygen index of 24.9 and a UL–94 rating of SE–1.

It is obvious that many variations may be made in the products and processes set forth above without departing from the spirit and scope of this invention.

What is claimed is:

1. A self-extinguishing composition comprising about 55–70% by weight of polyethylene, about 2–10% by weight of a halogenated organic flame retardant, about 5–10% by weight of ammonium fluoborate or ammonium sulfate, about 5–10% by weight of antimony trioxide, and about 15–25% by weight of silica.

2. The composition of claim 1 wherein the concentration of polyethylene is about 60% by weight.

3. The composition of claim 1 wherein the flame retardant is decabromobiphenyl, hexabromobiphenyl, or hexabromodiphenyl ether.

4. The composition of claim 3 wherein the flame retardant is a halogenated aliphatic compound corresponding to the formula

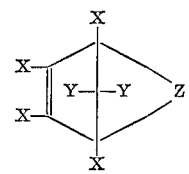

wherein X is chloro or bromo, Y is halo, hydrogen, alkyl, or alkoxy, and Z is a divalent polybromo aliphatic or cycloaliphatic hydrocarbon radical containing at least four carbon atoms and at least two bromo substituents, the free valences being on adjacent carbon atoms; and the concentration of the flame retardant is about 5–10% by weight.

5. The composition of claim 4 wherein the flame retardant is a dibrominated 1:1 Diels-Alder adduct of hexachlorocyclopentadiene and cyclooctadiene-1,5.

6. The composition of claim 1 wherein the flame retardant is a halogenated aliphatic compound containing the structure

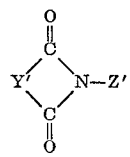

wherein Z' is a hydrocarbon, chlorinated hydrocarbon, or brominated hydrocarbon radical and Y' is a divalent radical corresponding to one of the formulas

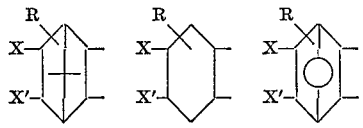

wherein X is chloro or bromo, X' is hydrogen, chloro, or bromo, and R is hydrogen or methyl.

7. The composition of claim 6 wherein the flame retardant is N-2,3-dibromopropyl-5,6-dibromonorbornane-2,3-dicarboximide.

8. The composition of claim 1 wherein the flame retardant is a halogenated butadiene or isoprene oligomer having a degree of polymerization of 2–2000.

9. The composition of claim 8 wherein the flame retardant is tetrabromocyclooctane, dibromoethyldibromocyclohexane, or hexabromocyclododecane.

References Cited

UNITED STATES PATENTS

| | | | |
|---|---|---|---|
| 3,239,482 | 3/1966 | Rapp | 260—41 |
| 3,510,429 | 5/1970 | Iserson et al. | 106—15 FP |
| 3,483,158 | 12/1969 | Beacham | 260—41 |
| 3,075,944 | 1/1963 | Wick et al. | 260—41 |
| 3,418,263 | 12/1968 | Hindersinn | 106—15 FP |
| 2,795,589 | 6/1957 | Bluestone | 260—326 C |
| 3,542,805 | 11/1970 | Cyba | 260—326 C |
| 3,093,599 | 6/1963 | Mueller-Tamm | 260—45.7 R |
| 3,257,267 | 6/1966 | Hay | 106—15 FP |
| 3,331,797 | 7/1967 | Kopetz | 260—45.7 R |

MORRIS LIEBMAN, Primary Examiner

J. H. DERRINGTON, Assistant Examiner

U.S. Cl. X.R.

106—15 FP; 260—41 B, 45.7 R, 45.8 N, 45.8 NZ, 45.9 R, 326 C, 326 HL